(12) United States Patent
Chen et al.

(10) Patent No.: US 10,326,622 B2
(45) Date of Patent: Jun. 18, 2019

(54) EQUALIZER TUNING METHOD, SIGNAL RECEIVING CIRCUIT AND A MEMORY STORAGE DEVICE

(71) Applicant: PHISON ELECTRONICS CORP., Miaoli (TW)

(72) Inventors: Sheng-Wen Chen, Taichung (TW); Shin-Yang Sun, Taoyuan (TW); Wei-Yung Chen, Hsinchu County (TW); Jen-Chu Wu, New Taipei (TW); Chih-Ming Chen, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 15/836,903

(22) Filed: Dec. 10, 2017

(65) Prior Publication Data

US 2019/0116069 A1 Apr. 18, 2019

(30) Foreign Application Priority Data

Oct. 13, 2017 (TW) .............................. 106135220 A

(51) Int. Cl.
*H04L 25/03* (2006.01)
*H04L 25/497* (2006.01)
*H04L 7/00* (2006.01)
*G06F 3/06* (2006.01)

(52) U.S. Cl.
CPC ...... *H04L 25/03019* (2013.01); *G06F 3/0604* (2013.01); *H04L 7/0058* (2013.01); *H04L 25/497* (2013.01)

(58) Field of Classification Search
CPC ......... H04L 25/03057; H04L 25/03885; H04L 2025/03503
USPC .................................................. 375/232, 233
See application file for complete search history.

(56) References Cited

U.S. PATENT DOCUMENTS

| 9,467,314 | B1 | 10/2016 | Wei et al. | |
|---|---|---|---|---|
| 2005/0259726 | A1* | 11/2005 | Farjad-rad | H04L 25/03019 375/232 |
| 2010/0329322 | A1* | 12/2010 | Mobin | H04L 25/03057 375/231 |
| 2013/0142245 | A1* | 6/2013 | Sindalovsky | H04L 25/03057 375/233 |
| 2016/0134443 | A1* | 5/2016 | Berke | H04L 25/03885 375/232 |

OTHER PUBLICATIONS

"Office Action of Taiwan Counterpart Application", dated May 23, 2018, p. 1-p. 6.

* cited by examiner

*Primary Examiner* — Kevin Kim
(74) *Attorney, Agent, or Firm* — JCIPRNET

(57) ABSTRACT

An equalizer tuning method for a memory storage device is provided according to an exemplary embodiment of the disclosure. The method includes: receiving a first signal; modulating the first signal by a first modulation circuit according to a first type parameter and modulating the first signal by a second modulation circuit according to a second type parameter; detecting a signal eye-width value and a signal eye-height value of the modulated first signal; and adjusting the first type parameter according to the detected signal eye-width value and adjusting the second type parameter according to the detected signal eye-height value.

24 Claims, 8 Drawing Sheets

| First type parameter | Second type parameter | Signal eye-height value | Signal eye-width value |
|---|---|---|---|
| P1(1) | P2(6) | EH(1) | EW(1) |
| P1(2) | P2(9) | EH(2) | EW(2) |
| P1(3) | P2(1) | EH(3) | EW(3) |
| P1(4) | P2(7) | EH(4) | EW(4) |

| Second type parameter | First type parameter | Signal eye-width value | Signal eye-height value |
|---|---|---|---|
| P2(1) | P1(3) | EW(1) | EH(1) |
| P2(2) | P1(1) | EW(2) | EH(2) |
| P2(3) | P1(5) | EW(3) | EH(3) |
| P2(4) | P1(2) | EW(4) | EH(4) |

EQUALIZER TUNING METHOD, SIGNAL RECEIVING CIRCUIT AND A MEMORY STORAGE DEVICE

CROSS-REFERENCE TO RELATED APPLICATION

This application claims the priority benefit of Taiwan application serial no. 106135220, filed on Oct. 13, 2017. The entirety of the above-mentioned patent application is hereby incorporated by reference herein and made a part of this specification.

BACKGROUND

1. Technology Field

The disclosure relates to an equalizer tuning method, a signal receiving circuit and a memory storage device.

2. Description of Related Art

Along with the rapid growth of digital cameras, cell phones, and MP3 players in recently years, consumers' demand on storage media has been increased drastically. A rewritable non-volatile memory module (e.g., a flash memory), as having features such as data non-volatility, low power consumption, small volume, and non-mechanical structure, high reading and writing speed, has become adaptable to be installed in various portable multi-media devices listed above.

With advancement in signal transmission speed, it is getting more and more important for improving the data reception capability of signal receiver. For example, an adaptive equalizer can be applied in a receiver for wired transmission. Some types of adaptive equalizers may be capable of dynamically adjusting parameters, however, most of the adaptive equalizers, due to the limitation from weakness of tuning algorithm, fail to have preferable tuning capability.

Nothing herein should be construed as an admission of knowledge in the prior art of any portion of the disclosure. Furthermore, citation or identification of any document in this application is not an admission that such document is available as prior art to the disclosure, or that any reference forms a part of the common general knowledge in the art.

SUMMARY

Exemplary embodiments of the disclosure provide an equalizer tuning method, a signal receiving circuit and a memory storage device capable of enhancing tuning accuracy of an equalizer circuit.

An exemplary embodiment of the disclosure provides an equalizer tuning method for a signal receiving circuit of a memory storage device. The equalizer tuning method includes: receiving a first signal; modulating the first signal by a first modulation circuit according to a first type parameter and modulating the first signal by a second modulation circuit according to a second type parameter; detecting a signal eye-width value and a signal eye-height value of the modulated first signal; and adjusting the first type parameter according to the detected signal eye-width value and adjusting the second type parameter according to the detected signal eye-height value.

Another exemplary embodiment of the disclosure provides a signal receiving circuit for a memory storage device. The signal receiving circuit includes an equalizer circuit and a control circuit. The control circuit is coupled to the equalizer circuit. The equalizer circuit includes a first modulation circuit and a second modulation circuit. The equalizer circuit is configured to receive a first signal. The first modulation circuit is configured to modulate the first signal according to a first type parameter, and the second modulation circuit is configured to modulate the first signal according to a second type parameter. The control circuit is configured to detect a signal eye-width value and a signal eye-height value of the modulated first signal. The control circuit is further configured to adjust the first type parameter according to the detected signal eye-width value and adjust the second type parameter according to the detected signal eye-height value.

Another exemplary embodiment of the disclosure provides a memory storage device including a connection interface unit, a rewritable non-volatile memory module and a memory control circuit unit. The connection interface unit is configured to be coupled to host system. The memory control circuit unit is coupled to the connection interface unit and the rewritable non-volatile memory module. The connection interface unit includes a signal receiving circuit. The signal receiving circuit includes a first modulation circuit and a second modulation circuit. The signal receiving circuit is configured to receive a first signal. The first modulation circuit is configured to modulate the first signal according to a first type parameter, and the second modulation circuit is configured to modulate the first signal according to a second type parameter. The signal receiving circuit is configured to detect a signal eye-width value and a signal eye-height value of the modulated first signal. The signal receiving circuit is further configured to adjust the first type parameter according to the detected signal eye-width value and adjust the second type parameter according to the detected signal eye-height value.

Based on the above, the first modulation circuit and the second modulation circuit of the equalizer circuit can modulate the first signal respectively according to the first type parameter and the second type parameter. Then, according to the signal eye-width value and the signal eye-height value of the modulated first signal, the first type parameter used by the first modulation circuit and the second type parameter used by the second modulation circuit can be adjusted, so as to enhance the tuning accuracy of the equalizer.

It should be understood, however, that this Summary may not contain all of the aspects and embodiments of the disclosure, is not meant to be limiting or restrictive in any manner, and that the disclosure as disclosed herein is and will be understood by those of ordinary skill in the art to encompass obvious improvements and modifications thereto.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
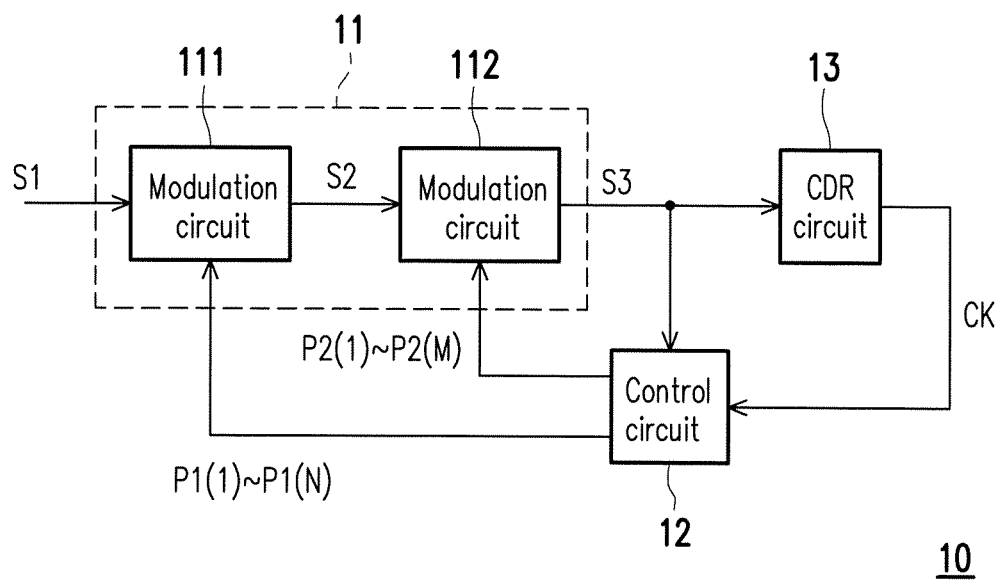
FIG. 1A is a schematic diagram illustrating a signal receiving circuit according to a first exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments are provided below to describe the disclosure in detail, though the disclosure is not limited to the provided embodiments. Moreover, the provided embodiments can be suitably combined. A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or in a specific connection means. Moreover, a term "signal" may refer to at least one current, voltage, charge, temperature, data or any other one or more signals.

Embodiments of the disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

Figure 1B:
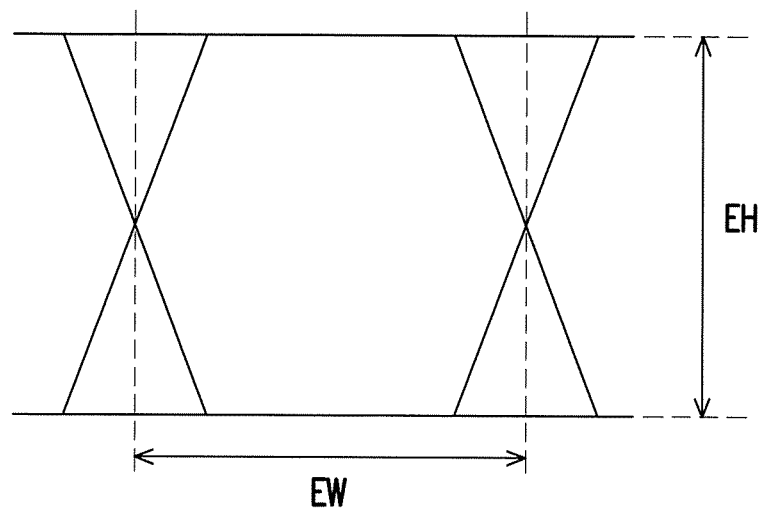
FIG. 1B is a schematic diagram illustrating a first signal according to the first exemplary embodiment of the disclosure.

FIG. 1A is a schematic diagram illustrating a signal receiving circuit according to a first exemplary embodiment of the disclosure. FIG. 1B is a schematic diagram illustrating a first signal according to the first exemplary embodiment of the disclosure. Referring to FIG. 1A and FIG. 1B, a signal receiving circuit 10 includes an equalizer circuit 11, a control circuit 12 and a clock and data recovery (CDR) circuit 13.

The equalizer circuit 11 is configured to receive a signal S1 (also referred to as a first signal). In the present exemplary embodiment, the signal S1 is a data signal. For example, the signal S1 may have a plurality of pulses for transmitting a series of bit data. For example, each bit data refers to a bit "0" or "1". The signal S1 refers to a signal with channel loss. For example, the degree of the channel loss is related to, for example, a length of a channel (e.g., a wired/wireless channel), noise intensity of the channel or other factors. The equalizer circuit 11 may compensate a high-frequency part and/or a low-frequency part of the signal S1. In the present exemplary embodiment, the equalizer circuit 11 may modulate the signal S1 and output a signal S3. For example, the equalizer circuit 11 may modulate the signal S1 by using different parameters to attempt to output the signal S3 having preferable signal quality or a pulse waveform favorable for analysis.

In the present exemplary embodiment, pulse waveforms of signals S1, S2 and S3 may be considered as including a plurality of eyes. For example, a signal eye-width value EW of the signal S3 may be employed to represent a width of an eye in the pulse waveform of the signal S3. A signal eye-height value EH of the signal S3 may be employed to represent a height of an eye in the pulse waveform of the signal S3. Generally, if the signal eye-width value EW of the signal S3 has a larger value, and/or the signal eye-height value EH has a larger value, it represents that the signal S3 has better signal quality (for example, sampling of the signal S3 is easier and more accurate). Otherwise, if the signal eye-width value EW of the signal S3 has a smaller value, and/or the signal eye-height value EH has a smaller value, it represents that the signal S3 has poorer signal quality (for example, the sampling of the signal S3 is more difficult and subject to the occurrence of errors).

The equalizer circuit 11 includes a modulation circuit 111 and a modulation circuit 112. The modulation circuit 112 is coupled to the modulation circuit 111. In the present exemplary embodiment, an input terminal of the modulation circuit 112 is coupled to an output terminal of the modulation circuit 111. However, in another exemplary embodiment, the input terminal of the modulation circuit 111 may be coupled to the output terminal of the modulation circuit 112 or in another coupling manner, which is not limited in the disclosure.

The modulation circuit 111 is configured to modulate the signal S1 and generate the signal S2. In other words, the signal S2 refers to the signal S1 modulated by the modulation circuit 111. The modulation circuit 112 is configured to modulate the signal S2 and generate the signal S3. In other words, the signal S3 refers to the signal S2 modulated by the modulation circuit 112 or the signal S1 modulated by the modulation circuits 111 and 112.

In the present exemplary embodiment, one of the modulation circuits 111 and 112 includes at least one continuous-time linear equalizer (CTLE), and the other one of the modulation circuits 111 and 112 includes at least one decision feedback equalizer (DFE). However, in another exemplary embodiment, at least one of the modulation circuits 111 and 112 may also include other equalizers or auxiliary circuits, e.g., an infinite impulse response (IIR), which is not limited in the disclosure.

In the present exemplary embodiment, one of the modulation circuits 111 and 112 is mainly employed to improve signal quality of the waveform of the signal S1 in a specific signal analysis direction (also referred to as a first signal analysis direction), and the other one of the modulation circuits 111 and 112 is mainly employed to improve signal quality of the waveform of the signal S1 in another signal analysis direction (also referred to as a second signal analysis direction). The first signal analysis direction is different from the second signal analysis direction. In an exemplary embodiment, the first signal analysis direction may be substantially perpendicular to the second signal analysis direction. In this case, being substantially perpendicular indicates being approximately perpendicular with a tolerable minor deviation.

In an exemplary embodiment, the modulation circuit 111 is configured to modulate the signal S1 to mainly change (e.g., increase) the signal eye-width value EW of the signal S3, and the modulation circuit 112 is configured to modulate the signal S2 to mainly change (e.g., increase) the signal eye-height value EH of the signal S3. In another exemplary embodiment, the modulation circuit 111 is configured to modulate the signal S1 to mainly change (e.g., increase) the signal eye-height value EH of the signal S3, and the modulation circuit 112 is configured to modulate the signal S2 to mainly change (e.g., increase) the signal eye-width value EW of the signal S3. In other words, in an exemplary embodiment, the first signal analysis direction is an adjusting direction and/or analyzing direction of one of the eye-height and the eye-width of the signal S1, and the second signal analysis direction is an adjusting direction and/or analyzing direction of the other one of the eye-height and the eye-width of the signal S1. In addition, in actual implementation, the modulation operations (e.g., the eye-width modulation or the eye-height modulation) respectively performed by the modulation circuits 111 and 112 on the signal S1 may also affect each other, without being limited to solely modulating the signal eye-width value EW or the signal eye-height value EH.

The control circuit 12 is coupled to the equalizer circuit 11. The control circuit 12 may analyze the signal S3 and detect the signal eye-width value EW and the signal eye-height value EH of the signal S3. The control circuit 12 may adjust first type parameters (also referred to as first type modulation parameters) P1(1) to P1(N), which are provided to the equalizer circuit 11, according to the detected signal eye-width value EW. The control circuit 12 may adjust second type parameters (also be referred to as second type modulation parameters) P2(1) to P2(M), which are provided to the equalizer circuit 11, according to the detected signal eye-height value EH. Both N and M are positive integers, and N may be equal to or different from M.

In an exemplary embodiment, the first type parameters P1(1) to P1(N) are mainly associated with the adjustment of the signal eye-width value EW of the signal S3, and the second type parameters P2(1) to P2(M) are mainly associated with the adjustment of the signal eye-height value EH of the signal S3. However, in another exemplary embodiment, the first type parameters P1(1) to P1(N) may also affect the signal eye-height value EH of the signal S3, and/or the second type parameters P2(1) to P2(M) may also affect the signal eye-width value EW of the signal S3. One of the modulation circuits 111 and 112 may receive the first type parameters P1(1) to P1(N) and modulate the signal S1 (or the signal S2) according to the first type parameters P1(1) to P1(N). The other one of the modulation circuits 111 and 112 may receive the second type parameters P2(1) to P2(M) and modulate the signal S1 (or the signal S2) according to the second type parameters P2(1) to P2(M).

In an exemplary embodiment, the one of the modulation circuits 111 and 112 which modulates the signal S1 (or the signal S2) according to the first type parameters P1(1) to P1(N) is also referred to as a first modulation circuit, and the other one of the modulation circuits 111 and 112 which modulates the signal S1 (or the signal S2) according to the second type parameters P2(1) to P2(M) is also referred to as a second modulation circuit. In an exemplary embodiment, it is assumed that the first type parameters P1(1) to P1(N) are provided to be used by the CTLE, and N is, for example, 343(7×7×7) or any other value. In an exemplary embodiment, it is assumed that the second type parameters P2(1) to P2(M) are provided to be used by the DFE, and M is, for example, 11025(15×15×7×7) or any other value.

In the present exemplary embodiment, the CDR circuit 13 is coupled to the equalizer circuit 11 and may receive the signal S3. The CDR circuit 13 may perform a phase lock operation on the signal S3 and generate a clock signal CK. The CDR circuit 13 will not be described in detail hereinafter. In the present exemplary embodiment, the control circuit 12 may further receive the clock signal CK output by the CDR circuit 13 and be driven by the clock signal CK and/or may perform a preset operation according to the clock signal CK. In another exemplary embodiment, the CDR circuit 13 may also be separated from the signal receiving circuit 10.

Figure 2:
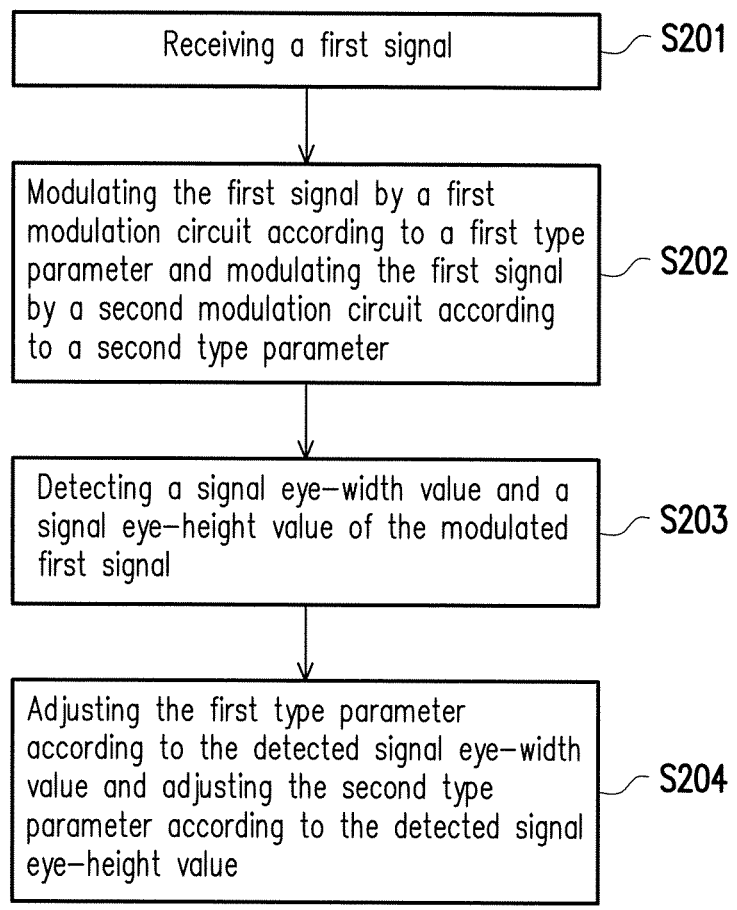
FIG. 2 is a flowchart illustrating an equalizer tuning method according to the first exemplary embodiment of the disclosure.

FIG. 2 is a flowchart illustrating an equalizer tuning method according to the first exemplary embodiment of the disclosure. Referring to FIG. 2, in step S201, a first signal is received. In step S202, the first signal is modulated by a first modulation circuit according to a first type parameter, and the first signal is modulated by a second modulation circuit according to a second type parameter. In step S203, a signal eye-width value and a signal eye-height value of the modulated first signal are detected. In step S204, the first type parameter is adjusted according to the detected signal eye-width value, and the second type parameter is adjusted according to the detected signal eye-height value.

Second Exemplary Embodiment

Figures 3A, 3B:
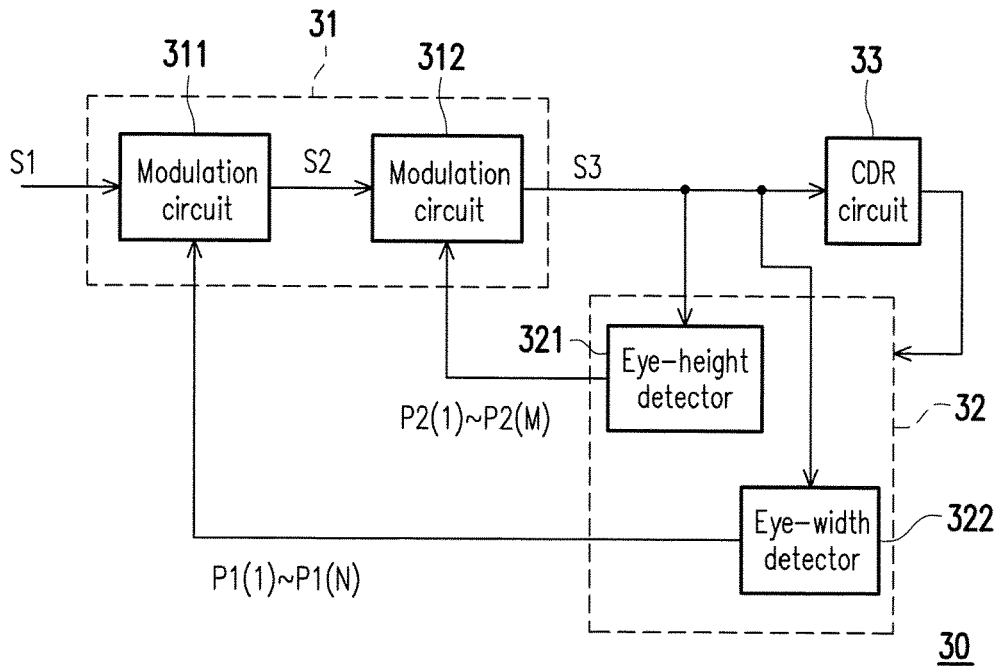
FIG. 3A is a schematic diagram illustrating a signal receiving circuit according to a second exemplary embodiment of the disclosure.
FIG. 3B is a schematic diagram illustrating a table recording a first type parameter, a second type parameter, a signal eye-height value and a signal eye-width value according to the second exemplary embodiment of the disclosure.

FIG. 3A is a schematic diagram illustrating a signal receiving circuit according to a second exemplary embodiment of the disclosure. FIG. 3B is a schematic diagram illustrating a table recording a first type parameter, a second type parameter, a signal eye-height value and a signal eye-width value according to the second exemplary embodiment of the disclosure. Referring to FIG. 3A, a signal receiving circuit 30 includes an equalizer circuit 31, a control circuit 32 and a CDR circuit 33. The CDR circuit 33 is the same as or similar to the CDR circuit 13 illustrated in FIG. 1A and will not be described in detail hereinafter.

The equalizer circuit 31 includes modulation circuits 311 and 312. The modulation circuit 311 is configured to receive the first type parameters P1(1) to P1(N) and modulated the signal S1 according to the first type parameters P1(1) to P1(N) to output the signal S2. The modulation circuit 312 is configured to receive the second type parameters P2(1) to P2(M) and modulate the signal S2 according to the second type parameters P2(1) to P2(M) to output the signal S3. For example, the modulation circuit 311 may include at least one CTLE, and/or the modulation circuit 312 may include at least one DFE.

The control circuit 32 includes an eye-height detector 321 and an eye-width detector 322. The eye-height detector 321 is configured to analyze the signal S3 and detect the signal eye-height value EH of the signal S3. The eye-width detector 322 is configured to analyze the signal S3 and detect the signal eye-width value EW of the signal S3. The eye-height detector 321 may adjust the output second type parameters P2(1) to P2(M) according to the detected signal eye-height value EH. The eye-width detector 322 may adjust the output first type parameters P1(1) to P1(N) according to the detected signal eye-width value EW.

In an exemplary embodiment, the eye-width detector 322 may output a parameter P1(i) for being used by the modulation circuit 311, where i is between 1 and N. During a period of the modulation circuit 311 modulating the signal S1 by using the parameter P1(i), the eye-height detector 321 may sequentially output parameters P2(j) to P2(k), where j and k are integers less than or equal to M, and j is less than k. In other words, during the period of the modulation circuit 311 modulating the signal Si by using the parameter P1(i), the modulation circuit 312 may modulate the signal S2 by sequentially using the parameters P2(j) to P2(k).

After the modulation circuit 312 modulates the signal S2 by sequentially using the parameters P2(j) to P2(k), the eye-width detector 322 may output a parameter P1(p) for being used by the modulation circuit 311, where p is between 1 and N, and p is not equal to i. During a period of the modulation circuit 311 modulating the signal Si by using the parameter P1(p), the eye-height detector 321 may sequentially output parameters P2(q) to P2(r), where q and r are integers less than or equal to M, and q is less than r. In other words, during the period of the modulation circuit 311 modulating the signal S1 by using the parameter P1(p), the modulation circuit 312 modulates the signal S2 by sequentially using the parameters P2(q) to P2(r). In the same way, in an exemplary embodiment, the modulation circuit 311 modulates the signal S1 by sequentially using at least a part of the first type parameters P1(1) to P1(N), and during a period of the modulation circuit 311 modulating the signal S1 by using one of the first type parameters P1(1) to P1(N), the modulation circuit 312 modulates the signal S2 by sequentially using at least a part of the second type parameters P2(1) to P2(M).

In an exemplary embodiment, during the period of the modulation circuit 311 modulating the signal S1 by using one of the first type parameters P1(1) to P1(N), the eye-height detector 321 may dynamically adjust the output second type parameters according to the detected signal eye-height value EH. For example, in an exemplary embodiment, the eye-height detector 321 may adjust the output second type parameters according to the detected signal eye-height value EH by using a least mean square (LMS) algorithm, thereby achieving optimization of the detected signal eye-height value EH. Alternatively, in an exemplary embodiment, the eye-height detector 321 may also adjust the output second type parameters by using a blind testing algorithm or other algorithms, which is not limited in the disclosure.

In an exemplary embodiment, during the period of the modulation circuit 311 modulating the signal S1 by using one of the first type parameters P1(1) to P1(N), the eye-height detector 321 may detect a qualified signal eye-height value of the signal S3, and the eye-width detector 322 may detect a signal eye-width value of the signal S3 having the qualified signal eye-height value. For example, the qualified signal eye-height value of the signal S3 may be a maximum among a plurality of signal eye-height values of the signal S3 which are detected during the period of the modulation circuit 311 modulating the signal S1 by using one of the first type parameters P1(1) to P1(N). From another perspective, during the period of the modulation circuit 311 modulating the signal S1 by using one of the first type parameters P1(1) to P1(N), the detected signal eye-height value EH and its corresponding signal eye-width value EW correspond to a combination of one of the first type parameters and one of the second type parameters. It is noted that, in one exemplary embodiment, the qualified signal eye-height value refers to a parameter value which indicates that the signal eye-height of the modulated signal meets a default requirement, and/or the qualified signal eye-width value refers to a parameter value which indicates that the signal eye-width of the modulated signal meets another default requirement. In one exemplary embodiment, the modulated signal with the qualified signal eye-height value refers to that the modulated signal has a signal eye-height better (e.g., larger) than an original signal eye-height of the original signal. In one exemplary embodiment, the modulated signal with the qualified signal eye-width value refers to that the modulated signal has a signal eye-width better (e.g., larger) than an original signal eye-width of the original signal.

Referring to FIG. 3B, it is assumed that during the period of the equalizer circuit 31 performing the modulation, the used first type parameters and second type parameters and the detected signal eye-height values and signal eye-width values are at least partially recorded in a table 34. The table 34 may be temporarily stored in the control circuit 32. The information in the table 34 indicates that the modulation circuit 312 obtains the signal S3 having a qualified signal eye-height value EH(1) and a signal eye-width value EW(1) by modulating the signal S2 by using the parameter P2(6) during a period of the modulation circuit 311 modulating the signal S1 by using the parameter P1(1), the modulation circuit 312 obtains the signal S3 having a qualified signal eye-height value EH(2) and a signal eye-width value EW(2) by modulating the signal S2 by using the parameter P2(9) during a period of the modulation circuit 311 modulating the signal S1 by using the parameter P1(2), the modulation circuit 312 obtains the signal S3 having a qualified signal eye-height value EH(3) and a signal eye-width value EW(3) by modulating the signal S2 by using the parameter P2(1) during a period of the modulation circuit 311 modulating the signal S1 by using the parameter P1(3), and the modulation circuit 312 obtains the signal S3 having a qualified signal eye-height value EH(4) and a signal eye-width value EW(4) by modulating the signal S2 by using the parameter P2(7) during a period of the modulation circuit 311 modulating the signal S1 by using the parameter P1(4).

In an exemplary embodiment, the eye-height detector 321 and the eye-width detector 322 may adjust the parameters according to the information recorded in the table 34, thereby achieving synchronous optimization of the eye-heights and the eye-widths of the signals. For example, the eye-width detector 322 may compare the signal eye-width values EW(1) to EW(4) and consider a maximum among the signal eye-width values EW(1) to EW(4) as the qualified signal eye-width value, for example, the signal eye-width value EW(2). According to the obtained qualified signal eye-width value, the eye-height detector 321 may set the parameter P2(9) among the second type parameters as the qualified second type parameter which is obtained after the modulation and instruct the modulation circuit 312 to use the parameter P2(9), and the eye-width detector 322 may set the parameter P1(2) among the first type parameters as the qualified first type parameter which is obtained after the modulation and instruct the modulation circuit 311 to use the parameter P1(2). Thereby, the synchronous optimization of the eye-heights and the eye-widths of the signals may be achieved.

It is noted that in the exemplary embodiment illustrated in FIG. 3B, the signal eye-height value EH(1) is the qualified signal eye-height value obtained based on the use of the parameter P1(1), the signal eye-height value EH(2) is the qualified signal eye-height value based on the use of the parameter P1(2), the signal eye-height value EH(3) is the qualified signal eye-height value obtained based on the use of the parameter P1(3), and the signal eye-height value EH(4) is the qualified signal eye-height value obtained based on the use of the parameter P1(4). However, actually, the signal eye-height value EH(2) may be less than the signal eye-height values EH(1), EH(3) and/or EH(4), but the disclosure is not limited thereto.

Figure 3C:
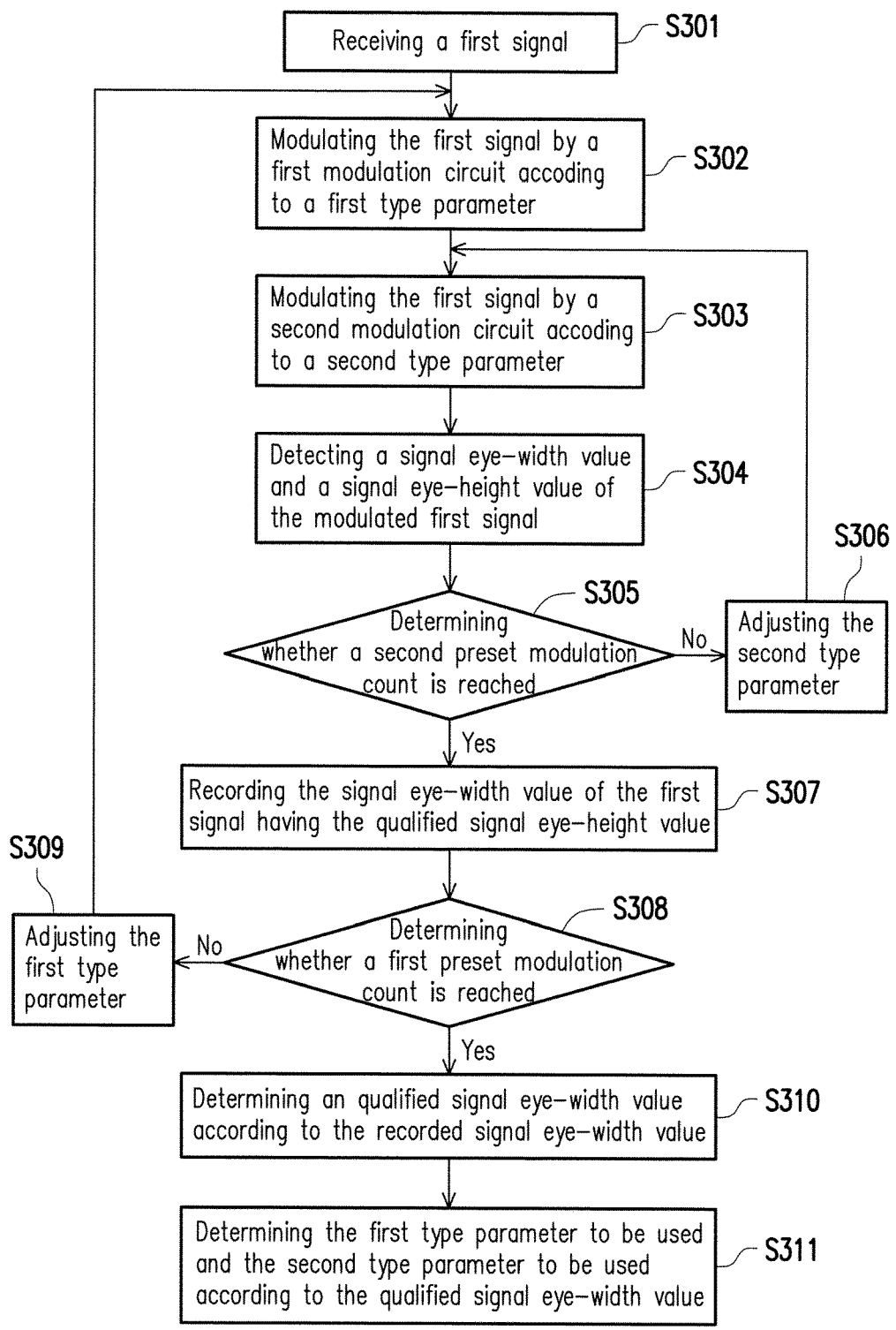
FIG. 3C is a flowchart illustrating an equalizer tuning method according to the second exemplary embodiment of the disclosure.

FIG. 3C is a flowchart illustrating an equalizer tuning method according to the second exemplary embodiment of the disclosure. Referring to FIG. 3C, in step S301, a first signal is received. In step S302, the first signal is modulated by a first modulation circuit (for example, the modulation circuit 311) by using one of the first type parameters. In step S303, the first signal is modulated by a second modulation circuit (for example, the modulation circuit 312) by using one of the second type parameters. In step S304, a signal eye-height value and a signal eye-width value of the modulated first signal are detected. In step S305, whether a number of times that the modulation operation is performed reaches a second preset modulation count is determined. In an exemplary embodiment, the second preset modulation count may be employed to determine whether all the to-be-tested second type parameters (e.g., the parameters P2(1) to P2(M)) have been used.

If, in step S305, it is determined that the number of times that the modulation operation is performed does not reach the second preset modulation count (for example, there are still unused second type parameters), then in step S306, the used second type parameters are adjusted (but the used first type parameters are not changed), and step S303 is repeated. In other words, if it is determined as no in step S305, the first modulation circuit maintains the currently used first type parameter, and the second modulation circuit is switched to use a next second type parameter to be tested.

If, in step S305, it is determined that the number of times that the modulation operation is performed reaches the second preset modulation count (for example, all the to-be-tested second type parameters have been used), then in step S307, the signal eye-width value of the first signal having the qualified signal eye-height value is recorded. In step S308, whether the number of times that the modulation operation is performed reaches a first preset modulation count is determined. In an exemplary embodiment, the first preset modulation count may be employed to determine whether all the to-be-tested first type parameters (e.g., the parameters P1(1) to P1(N)) have been used.

If, in step S308, it is determined that the number of times that the modulation operation is performed does not reach the first preset modulation count (for example, there are still unused first type parameters), then in step S309, the used first type parameters are adjusted, and step S302 is repeated. In other words, if it is determined as no in step S308, the first modulation circuit is switched to use a next first type parameter to be tested. After returning to step S302, steps S303 and S304 may be performed continuously.

If, in step S308, it is determined that the number of times that the modulation operation is performed reaches the first preset modulation count (for example, all the to-be-tested first type parameters have been used), in step S310, a qualified signal eye-width value is determined according to the recorded signal eye-width value. In step S311, the first type parameter to be used (i.e., a qualified first type parameter) and the second type parameter to be used (i.e., a qualified second type parameter) are determined according to the qualified signal eye-width value. Taking FIG. 3B for example, if it is assumed that the qualified signal eye-width value is the signal eye-width value EW(2), the first type parameter P1(2) may be determined as the qualified first type parameter, and the second type parameter P2(9) may be determined as the qualified second type parameter. Thereafter, the first modulation circuit and the second modulation circuit may modulate subsequently received signals respectively by using the qualified first type parameter and the qualified second type parameter, thereby enhancing signal quality of the received signals.

Third Exemplary Embodiment

Figures 4A, 4B:
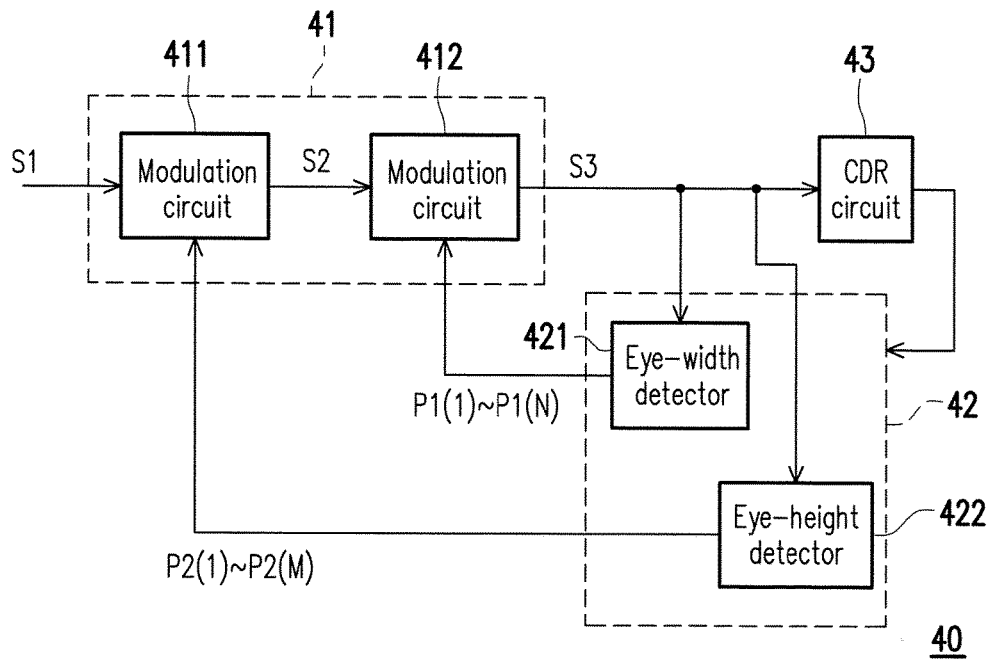
FIG. 4A is a schematic diagram illustrating a signal receiving circuit according to a third exemplary embodiment of the disclosure.
FIG. 4B is a schematic diagram illustrating a table recording a first type parameter, a second type parameter, a signal eye-height value and a signal eye-width value according to the third exemplary embodiment of the disclosure.

FIG. 4A is a schematic diagram illustrating a signal receiving circuit according to a third exemplary embodiment of the disclosure. FIG. 4B is a schematic diagram illustrating a table recording a first type parameter, a second type parameter, a signal eye-height value and a signal eye-width value according to the third exemplary embodiment of the disclosure. Referring to FIG. 4A, a signal receiving circuit 40 includes an equalizer circuit 41, a control circuit 42 and a CDR circuit 43. The CDR circuit 43 is the same as or similar to the CDR circuit 13 illustrated in FIG. 1A and will not be described in detailed hereinafter.

The equalizer circuit 41 includes modulation circuits 411 and 412. The modulation circuit 411 is configured to receive the second type parameters P2(1) to P2(M) and modulate the signal S1 according to the second type parameters P2(1) to P2(M) to output the signal S2. The modulation circuit 412 is configured to receive the first type parameters P1(1) to P1(N) and modulate the signal S2 according to the first type parameters P1(1) to P1(N) to output the signal S3. For example, the modulation circuit 411 may include at least one DFE, and/or the modulation circuit 412 may include at least one CTLE.

The control circuit 42 includes an eye-width detector 421 and an eye-height detector 422. The eye-width detector 421 is configured to analyze the signal S3 and detect the signal eye-width value EW of the signal S3. The eye-height detector 422 is configured to analyze the signal S3 and detect the signal eye-height value EH of the signal S3. The eye-width detector 421 may adjust the output first type parameters P1(1) to P1(N) according to the detected signal eye-width value EW. The eye-height detector 422 may adjust the output second type parameters P2(1) to P2(M) according to the detected signal eye-height value EH.

In an exemplary embodiment, the eye-height detector 422 may output a parameter P2(s) for being used by the modulation circuit 411, where s is between 1 and M. During a period of the modulation circuit 411 modulating the signal S1 by using the parameter P2(s), the eye-width detector 421 may sequentially output parameters P1(t) to P1(u), where t and u are integers less than or equal to N, and t is less than u. In other words, during the period of the modulation circuit 411 modulating the signal S1 by using the parameter P2(s), the modulation circuit 412 may modulate the signal S2 by sequentially using the parameters P1(t) to P1(u).

After the modulation circuit 412 modulates the signal S2 by sequentially using the parameters P1(t) to P1(u), the eye-height detector 422 may output a parameter P2(v) for being used by the modulation circuit 411, where v is between 1 and M, and v is not equal to s. During a period of the modulation circuit 411 modulating the signal S1 by using the parameter P2(v), the eye-width detector 421 may sequentially output parameters P1(w) to P1(x), where w and x are integers less than or equal to N, and w is less than x. In other words, during the period of the modulation circuit 411 modulating the signal S1 by using the parameter P2(v), the modulation circuit 412 modulates the signal S2 by sequentially using the parameter P1(w) to P1(x). In the same way, in an exemplary embodiment, the modulation circuit 411 may modulate the signal S1 by sequentially using at least a part of the second type parameters P2(1) to P2(M), and during a period of the modulation circuit 411 modulating the signal S1 by using one of the second type parameters P2(1) to P2(M), the modulation circuit 412 may modulate the signal S2 by sequentially using at least a part of the first type parameters P1(1) to P1(N).

In an exemplary embodiment, during the period of the modulation circuit 411 modulating the signal S1 by using one of the second type parameters P2(1) to P2(M), the eye-width detector 421 may dynamically adjust the output first type parameters according to the detected signal eye-width value EW. For example, in an exemplary embodiment, the eye-width detector 421 may adjust the output first type parameters according to the detected signal eye-width value EW by using a continuous-time linear algorithm, thereby achieving optimization of the detected signal eye-width value EW. Alternatively, in an exemplary embodiment, the eye-width detector 421 may also adjust the output first type parameters by using a blind testing algorithm or other algorithms, which is not limited in the disclosure.

In an exemplary embodiment, during the period of the modulation circuit 411 modulating the signal S1 by using one of the second type parameters P2(1) to P2(M), the eye-width detector 421 may detect a qualified signal eye-width value of the signal S3, and the eye-height detector 422 may detect a signal eye-height value of the signal S3 having the qualified signal eye-width value. For example, the qualified signal eye-width value of the signal S3 may be a maximum of a plurality of signal eye-width values of the signal S3 which are detected during the period of the modulation circuit 411 modulating the signal S1 by using one of the second type parameters P2(1) to P2(M). From another perspective, during the period of the modulation circuit 411 modulating the signal S1 by using one of the second type parameters P2(1) to P2(M), a detected signal eye-width value EW and its corresponding signal eye-height value EH also correspond to a combination of one of the first type parameters and one of the second type parameters.

Referring to FIG. 4B, it is assumed that during the period of the equalizer circuit 41 performing the modulation, the used first type parameters and second type parameters and the detected signal eye-height values and signal eye-width values are at least partially recorded in a table 44. The table 44 may be temporarily stored in the control circuit 42. The information in the table 44 indicates that the modulation circuit 412 obtains the signal S3 having a qualified signal eye-width value EW(1) and a signal eye-height value EH(1) by modulating the signal S2 by using the parameter P1(3) during a period of the modulation circuit 411 modulating the signal S1 by using the parameter P2(1), the modulation circuit 412 obtains the signal S3 having a qualified signal eye-width value EW(2) and a signal eye-height value EH(2) by modulating the signal S2 by using the parameter P1(1) during a period of the modulation circuit 411 modulating the signal S1 by using the parameter P2(2), the modulation circuit 412 obtains the signal S3 having a qualified signal eye-width value EW(3) and a signal eye-height value EH(3) by modulating the signal S2 by using the parameter P1(5) during a period of the modulation circuit 411 modulating the signal S1 by using the parameter P2(3), and the modulation circuit 412 obtains the signal S3 having a qualified signal eye-width value EW(4) and a signal eye-height value EH(4) by modulating the signal S2 by using the parameter P1(2) during a period of the modulation circuit 411 modulating the signal S1 by using the parameter P2(4).

In an exemplary embodiment, the eye-width detector 421 and the eye-height detector 422 may dynamically adjust the output parameters according to the information recorded in the table 44, thereby achieving synchronous optimization of eye-heights and eye-widths of the signals. For example, the eye-height detector 422 may compare the signal eye-height values EH(1) to EH(4) and consider a maximum among the signal eye-height values EH(1) to EH(4) as the qualified signal eye-height value, for example, the signal eye-height value EH(3). Alternatively, in an exemplary embodiment, the eye-height detector 422 may also determine the qualified signal eye-height value among the signal eye-height values EH(1) to EH(4) by using an LMS algorithm.

According to the obtained qualified signal eye-height value, the eye-width detector 421 may set the parameter P1(5) among the first type parameters as the qualified first type parameter which is obtained after the modulation and instruct the modulation circuit 412 to use the parameter P1(5), and the eye-height detector 422 may set the parameter P2(3) among the second type parameters as the qualified second type parameter which is obtained after the modulation and instruct the modulation circuit 411 to use the parameter P2(3). Thereby, the synchronous optimization of the eye-heights and the eye-widths of the signals may be obtained.

It is noted that in the exemplary embodiment illustrated in FIG. 4B, the signal eye-width value EW(1) is the qualified signal eye-width value obtained based on the use of the parameter P2(1), the signal eye-width value EW(2) is the qualified signal eye-width value obtained based on the use of the parameter P2(2), the signal eye-width value EW(3) is the qualified signal eye-width value obtained based on the use of the parameter P2(3), and the signal eye-width value EW(4) is the qualified signal eye-width value obtained based on the use of the parameter P2(4). However, actually, the signal eye-width value EW(3) may be less than the signal eye-width values EW(1), EW(2) and/or EW(4), but the disclosure is not limited thereto.

Figure 4C:
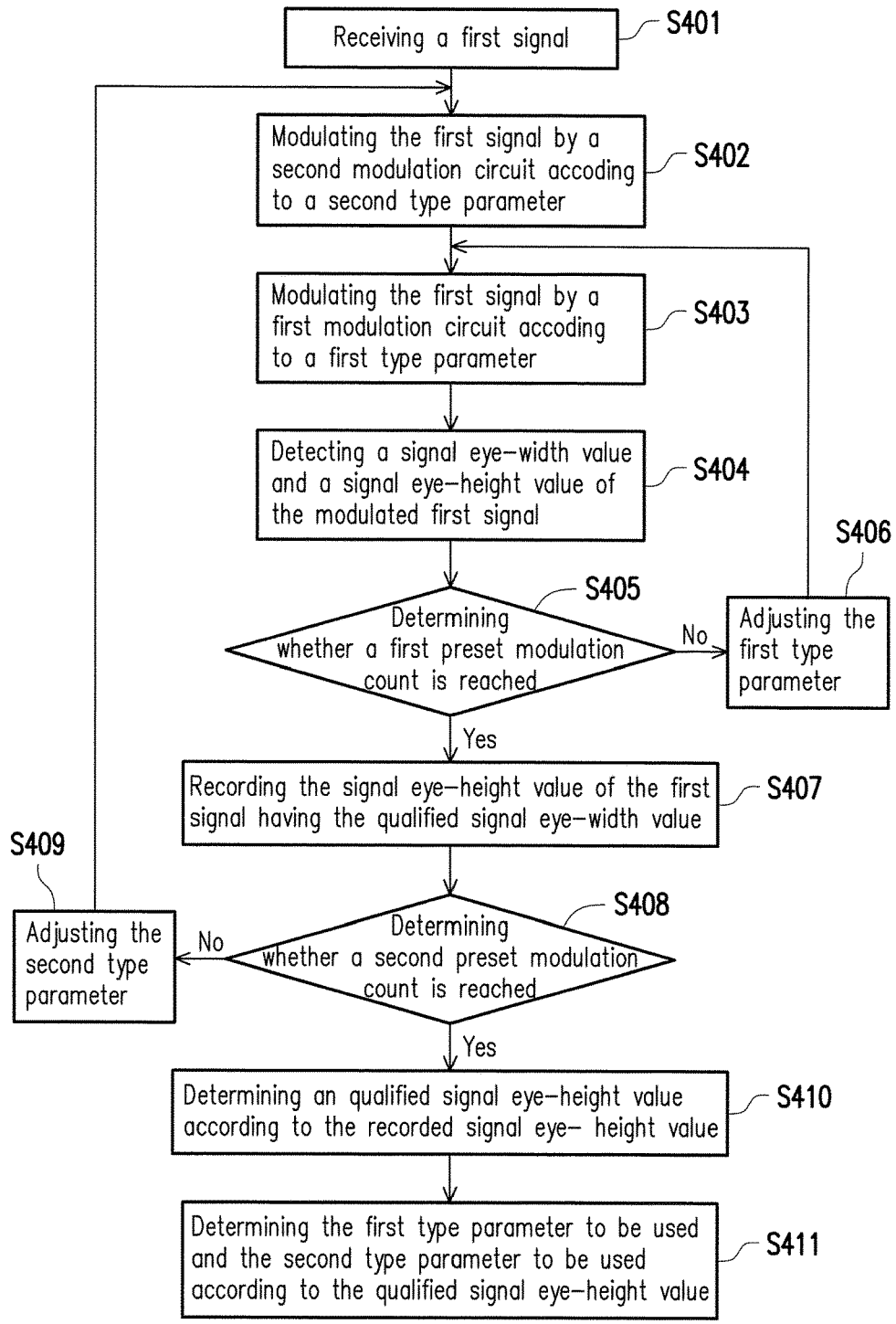
FIG. 4C is a flowchart illustrating an equalizer tuning method according to the third exemplary embodiment of the disclosure.

FIG. 4C is a flowchart illustrating an equalizer tuning method according to the third exemplary embodiment of the disclosure. Referring to FIG. 4C, in step S401, a first signal is received. In step S402, the first signal is modulated by a second modulation circuit (for example, the modulation circuit 411) by using one of the second type parameters. In step S403, the first signal is modulated by a first modulation circuit (for example, the modulation circuit 412) by using one of the first type parameters. In step S404, a signal eye-width value and a signal eye-height value of the modulated first signal are detected. In step S405, whether a number of times that the modulation operation is performed reaches a first preset modulation count is determined. For example, the first preset modulation count may be employed to determine whether all the to-be-tested first type parameters (e.g., the parameters P1(1) to P1(N)) have been used.

If, in step S405, it is determined that the number of times that the modulation operation is performed does not reach the first preset modulation count (for example, there are still unused first type parameters), then in step S406, the used first type parameters are adjusted (but the second type parameter in use are not changed), and step S403 is repeated. In other words, if it is detail lined as no in step S405, the second modulation circuit maintains the currently used second type parameter, and the first modulation circuit is switched to use a next first type parameter to be tested.

If, in step S405, it is determined that the number of times that the modulation operation is performed reaches the first preset modulation count (for example, all the to-be-tested first type parameters have been used), in step S407, the signal eye-height value of the first signal having the qualified signal eye-width value is recorded. In step S408, whether the number of times that the modulation operation is performed reaches a second preset modulation count is determined. For example, the second preset modulation count may be employed to determine whether all to-be-tested second type parameters (e.g., the parameter P2(1) to P2(M)) have been used.

If, in step S408, it is determined that the number of times that the modulation operation is performed does not reach the second preset modulation count (for example, there are still unused second type parameter), then in step S409, the used second type parameters are adjusted, and step S402 is repeated. In other words, if it is determined as no in step S408, the second modulation circuit is switched to use a next second type parameter to be tested.

If, in step S408, it is determined that the number of times that the modulation operation is performed reaches the second preset modulation count (for example, all the to-be-tested second type parameter have been used), then in, step S410, a qualified signal eye-height value is determined according to the recorded signal eye-height value. In step S411, a first type parameter to be used (i.e., a qualified first type parameter) and a second type parameter to be used (i.e., a qualified second type parameter) are determined according to the qualified signal eye-height value. Taking FIG. 4B for example, if it is assumed that the qualified signal eye-height value is the signal eye-height value EH(3), the first type parameter P1(5) may be determined as the qualified first type parameter, and the second type parameter P2(3) may be determined as the qualified second type parameter. Thereafter, the first modulation circuit and the second modulation circuit may modulate subsequently received signals respectively by using the qualified first type parameter and the qualified second type parameter, thereby enhancing signal quality of the received signals.

According to the exemplary embodiments described above, the control circuit of the signal receiving circuit may adjust the first type parameter and the second type parameter respectively (or separately) according to the signal eye-width value and the signal eye-height value of the modulated first signal. Even though the signal eye-width value and the signal eye-height value of the first signal may affect each other during the signal modulation process, the (qualified) first type parameter and the (qualified) second type parameter finally obtained through the modulation may also be employed to generate signals with preferable signal quality, which contributes to subsequent signal analysis operations (e.g., signal sampling and so on). In addition, the (qualified) first type parameter and the (qualified) second type parameter finally determined for being used are modulated respectively through the eye-width detection and the eye-height detection, instead of being generated according to one single modulation mechanism of the eye-width detection or the eye-height detection.

However, each step illustrated in FIG. 2, FIG. 3C and FIG. 4C has been described in detail above and will be no longer repeated. It is noted that each step illustrated in FIG. 2, FIG. 3C and FIG. 4C may be implemented as a plurality of program codes or circuits, which is not limited in the disclosure. The method illustrated in illustrated in FIG. 2, FIG. 3C and FIG. 4C may be used in cooperation with the above-described exemplary embodiments or may be used solely, which is not limited in the disclosure.

It is noted that in some of the exemplary embodiments which are not shown, the coupling relations of at least a part of the components in the signal receiving circuits 10, 30 and 40 may be adjusted, at least a part of the components in the signal receiving circuits 10, 30 and 40 may be substituted by circuit components with the same or similar functions, and more circuit components may also be added in the signal receiving circuits 10, 30 and 40 for providing additional functions.

In addition, each of the control circuits 12, 32 and 42 may be composed of a plurality of circuit components with embedded controllers or micro-controllers. For example, each of the eye-height detector 321, the eye-height detector 422, the eye-width detector 322 and the eye-width detector 421 may include at least one of a sampling circuit, a logic (e.g., AND, OR and/or XOR) circuit, a delay circuit, a flip-flop circuit, a latch circuit, an embedded controller or micro-controller. Moreover, in an exemplary embodiment, each of the control circuits 12, 32 and 42 may also include a memory and a microprocessor, and the microprocessor may load a required program and information from the memory to execute and/or instruct a corresponding function.

In an exemplary embodiment, the signal receiving circuit is configured to be used in a memory storage device (also known as a memory storage system). Generally, the memory storage device includes a rewritable non-volatile memory module and a controller (also referred to as a control circuit). The memory storage device is usually configured together with a host system so that the host system can write data into the memory storage device or read data from the memory storage device.

Figure 5:
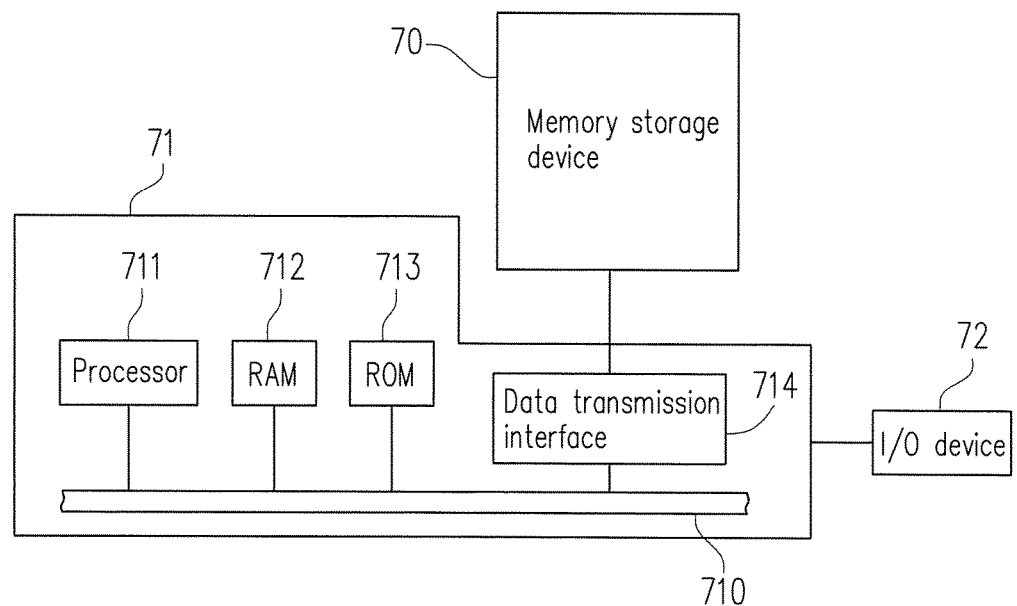
FIG. 5 is a schematic diagram illustrating a host system, a memory storage device and an input/output (I/O) device according to an exemplary embodiment of the disclosure.
Figure 6:
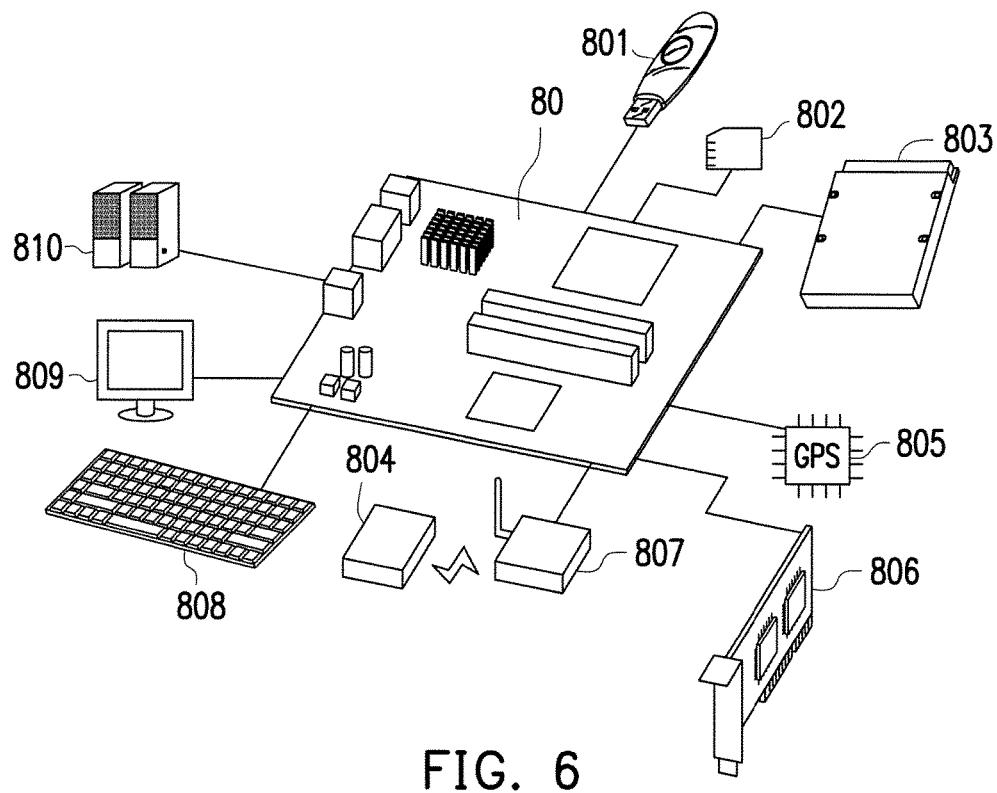
FIG. 6 is a schematic diagram illustrating a host system, a memory storage device and an I/O device according to another exemplary embodiment of the disclosure.

FIG. 5 is a schematic diagram illustrating a host system, a memory storage device and an input/output (I/O) device according to an exemplary embodiment of the disclosure. FIG. 6 is a schematic diagram illustrating a host system, a memory storage device and an I/O device according to another exemplary embodiment of the disclosure.

Referring to FIG. 5 and FIG. 6, a host system 71 generally includes a processor 711, a random access memory (RAM) 712, a read only memory (ROM) 713 and a data transmission interface 714. The processor 711, the RAM 712, the ROM 713 and the data transmission interface 714 are coupled to a system bus 710.

In the present exemplary embodiment, the host system 71 is coupled to a memory storage device 70 through the data transmission interface 714. For example, the host system 71 can store data into the memory storage device 70 or read data from the memory storage device 70 through the data transmission interface 714. In addition, the host system 71 is coupled to an I/O device 72 through the system bus 710. For example, the host system 71 may transmit output signals to the I/O device 72 or receive input signals from the I/O device 72 through the system bus 710.

In the present exemplary embodiment, the processor 711, the RAM 712, the ROM 713 and the data transmission interface 714 may be disposed on a main board 80 of the host system 71. The number of the data transmission interface 714 may be one or more. Through the data transmission interface 114, the main board 80 may be coupled to the memory storage device 70 in a wired manner or a wireless manner. The memory storage device 70 may be, for example, a flash drive 801, a memory card 802, a solid state drive (SSD) 803 or a wireless memory storage device 804. The wireless memory storage device 804 may be, for example, a memory storage device based on various wireless communication technologies, such as a near field communication (NFC) memory storage device, a wireless fidelity (WiFi) memory storage device, a Bluetooth memory storage device or a Bluetooth low energy (BLE) memory storage device (e.g., iBeacon). Further, the main board 80 may also be coupled to various I/O devices including a global positioning system (GPS) module 805, a network interface card 806, a wireless transmission device 807, a keyboard 808, a monitor 809 and a speaker 810 through the system bus 710. For example, in an exemplary embodiment, the main board 80 may access the wireless memory storage device 804 via the wireless transmission device 807.

Figure 7:
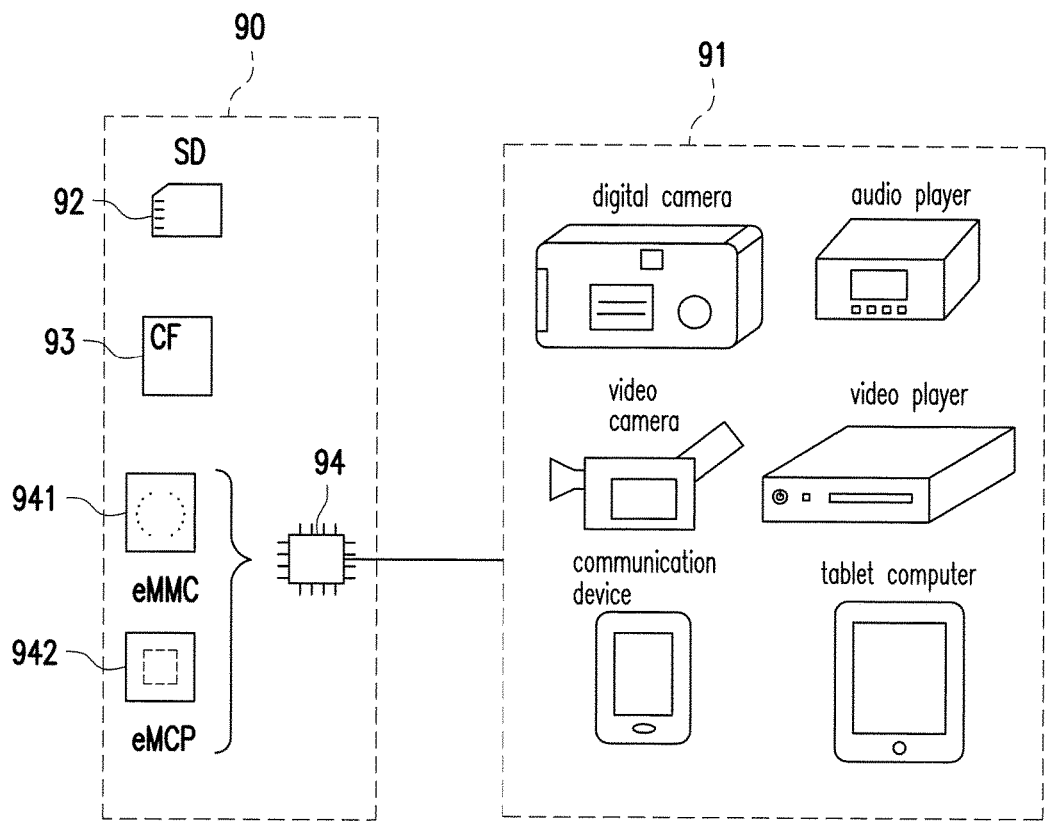
FIG. 7 is a schematic diagram illustrating a host system and a memory storage device according to another exemplary embodiment of the disclosure.

In an exemplary embodiment, the aforementioned host system may be any system capable of substantially cooperating with the memory storage device for storing data. Although the host system is illustrated as a computer system in foregoing exemplary embodiment, however, FIG. 7 is a schematic diagram illustrating a host system and a memory storage device according to another exemplary embodiment of the disclosure. Referring to FIG. 7, in another exemplary embodiment, a host system 91 may also be a system such as a digital camera, a video camera, a communication device, an audio player, a video player or a tablet computer, whereas a memory storage device 90 may be various non-volatile memory storage devices used by the host system 91, such as secure digital (SD) card 92, a compact flash (CF) card 93 or an embedded storage device 94. The embedded storage device 94 includes various embedded storage devices capable of directly coupling a memory module onto a substrate of the host system, such as an embedded Multi Media Card (eMMC) 941 and/or an embedded multi chip package (eMCP) storage device 942.

Figure 8:
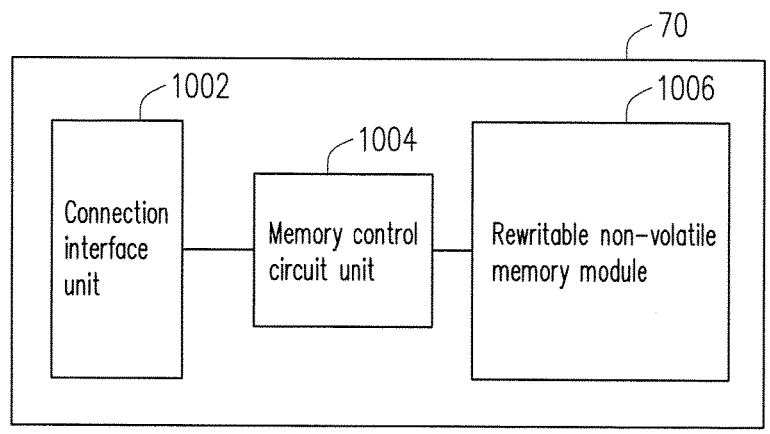
FIG. 8 is a schematic block diagram illustrating a memory storage device according to an exemplary embodiment of the disclosure.

FIG. 8 is a schematic block diagram illustrating a memory storage device according to an exemplary embodiment of the disclosure. Referring to FIG. 8, the memory storage device 70 includes a connection interface unit 1002, a memory control circuit unit 1004 and a rewritable non-volatile memory module 1006.

The connection interface unit 1002 is configured to couple the memory storage device 70 to the host system 71. In the present exemplary embodiment, the connection interface unit 1002 is compatible with a serial advanced technology attachment (SATA) standard. However, it should be understood that the disclosure is not limited thereto, and the connection interface unit 1002 may also be compliable with a parallel advanced technology attachment (PATA) standard, an (institute of electrical and electronic engineers (IEEE) 1394 standard, a peripheral component interconnect express (PCI Express) standard, a universal serial bus (USB) standard, an SD interface standard, an ultra high speed-I (UHS-I) interface standard, an ultra high speed-ii (UHS-II) interface standard, a memory stick (MS) interface standard, an MCP interface standard, MMC interface standard, an eMMC interface standard, a universal flash storage (UFS) interface standard, an eMCP interface standard, a CF interface standard, an integrated device electronics (IDE) standard or other suitable standards. The connection interface unit 1002 and the memory control circuit unit 1004 may be packaged in one chip, or the connection interface unit 1002 may be disposed outside a chip containing the memory control circuit unit 1004.

In an exemplary embodiment, the signal receiving circuit 10 depicted in FIG. 1A, the signal receiving circuit 30 depicted in FIG. 3A or the signal receiving circuit 40 depicted in FIG. 4A is disposed in the connection interface unit 1002 to receive and process the signal S1 from the host system 71. Alternatively, in an exemplary embodiment, at least a part of the signal receiving circuit 10 depicted in FIG. 1A, the signal receiving circuit 30 depicted in FIG. 3A and the signal receiving circuit 40 depicted in FIG. 4A may also be disposed in the memory control circuit unit 1004 to, likewise, receive and process the signal S1 from the host system 71.

The memory control circuit unit 1004 is configured to execute a plurality of logic gates or control commands which are implemented in a hardware form or in a firmware form and perform operations, such as writing, reading or erasing data in the rewritable non-volatile memory module 1006 according to the commands of the host system 71.

The rewritable non-volatile memory module 1006 is coupled to the memory control circuit unit 1004 and is configured to store data written from the host system 71. The rewritable non-volatile memory module 1006 may be a single level cell (SLC) NAND flash memory module (i.e., a flash memory module capable of storing one bit in one memory cell), a multi level cell (MLC) NAND flash memory module (i.e., a flash memory module capable of storing two bits in one memory cell), a triple level cell (TLC) NAND flash memory module (i.e., a flash memory module capable of storing three bits in one memory cell), other flash memory modules or any memory module having the same features.

In the rewritable non-volatile memory module 1006, one or more bits are stored by changing a voltage (also referred to as a threshold voltage hereinafter) of each memory cell. More specifically, in each memory cell, a charge trapping layer is between a control gate and a channel. An amount of electrons in the charge trapping layer may be changed by applying a write voltage to the control gate, thereby changing the threshold voltage of the memory cell. This operation of changing the threshold voltage of the memory cell is also referred to as "writing data into the memory cell" or "programming the memory cell". Along with the change of the threshold voltage, each memory cell in the rewritable non-volatile memory module 1006 has a plurality of storage states. The storage state which a memory cell is in may be determined by applying a read voltage, thereby obtaining one or more bits stored in the memory cell.

In the present exemplary embodiment, the memory cells of the rewritable non-volatile memory module 1006 may constitute a plurality of physical programming units, and these physical programming units may constitute a plurality of physical erasing units. Specifically, the memory cells on the same word line may constitute one or more of the physical programming units. If each memory cell is capable of storing two bits or more bits, the physical programming units on the same word line can be at least classified into a lower physical programming unit and an upper physical programming unit. For example, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or reliability of the lower physical programming unit is higher than reliability of the upper physical programming unit.

In the present exemplary embodiment, the physical programming unit is the smallest unit for programming. That is, the physical programming unit is the smallest unit for writing data. For example, the physical programming unit is a physical page or a physical sector. If the physical programming unit is the physical page, the physical programming units usually includes a data bit area and a redundancy bit area. The data bit area includes multiple physical sectors configured to store user data, and the redundant bit area is configured to store system data (e.g., management data such as error correcting code). In the present exemplary embodiment, the data bit area includes 32 physical sectors, and a size of each physical sector is 512 bytes (B). However, in other exemplary embodiments, the data bit area may also include 8, 16 physical sectors or physical sectors in a greater or smaller number, and the size of each physical sector may also be greater or smaller. On the other hand, the physical erasing unit is the smallest unit for erasing. Namely, each physical erasing unit contains the least number of memory cells to be erased together. For instance, the physical erasing unit is a physical block.

In light of the foregoing, the first modulation circuit and the second modulation circuit in the equalizer circuit can modulate the first signal respectively according to the first type parameter and the second type parameter. Then, according to the signal eye-width value and the signal eye-height value of the modulated first signal, the first type parameter used by the first modulation circuit and the second type parameter used by the second modulation circuit can be respectively and separately determined and adjusted, so as to enhance the tuning accuracy of the equalizer circuit. The previously described exemplary embodiments of the disclosure have the advantages aforementioned, wherein the advantages aforementioned not required in all versions of the disclosure.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An equalizer tuning method, for a signal receiving circuit of a memory storage device, the equalizer tuning method comprising:
   receiving a first signal;
   modulating, sequentially, the first signal by a first modulation circuit and an output of the first modulation circuit by a second modulation circuit, wherein a modulation performed by the first modulation circuit is performed according to a first type parameter, and a modulation performed by the second modulation circuit is performed according to a second type parameter;
   detecting a signal eye-width value and a signal eye-height value of the first signal which is sequentially modulated by the first modulation circuit and the second modulation circuit; and
   adjusting one of the first type parameter and the second type parameter according to the detected signal eye-width value and adjusting the other one of the first type parameter and the second type parameter according to the detected signal eye-height value.

2. The equalizer tuning method according to claim 1, wherein the step of modulating, sequentially, the first signal by the first modulation circuit and the output of the first modulation circuit by the second modulation circuit comprises:
   using a plurality of second modulation parameters sequentially to modulate the first signal by one of the first modulation circuit and the second modulation circuit during a period of modulating the first signal according to a first modulation parameter by the other one of the first modulation circuit and the second modulation circuit.

3. The equalizer tuning method according to claim 2, wherein the step of modulating, sequentially, the first signal by the first modulation circuit and the output of the first modulation circuit by the second modulation circuit further comprises:
   using a plurality of fourth modulation parameters sequentially to modulate the first signal by the one of the first modulation circuit and the second modulation circuit during a period of modulating the first signal according to a third modulation parameter by the other one of the first modulation circuit and the second modulation circuit,
   wherein the first modulation parameter is different from the third modulation parameter.

4. The equalizer tuning method according to claim 3, wherein the step of detecting the signal eye-width value and the signal eye-height value of the first signal which is sequentially modulated by the first modulation circuit and the second modulation circuit comprises:
   detecting a first signal eye-width value of the first signal having a first signal eye-height value during the period of modulating the first signal according to the first modulation parameter by the other one of the first modulation circuit and the second modulation circuit; and
   detecting a second signal eye-width value of the first signal having a second signal eye-height value during the period of modulating the first signal according to the third modulation parameter by the other one of the first modulation circuit and the second modulation circuit,
   wherein the step of adjusting the one of the first type parameter and the second type parameter according to the detected signal eye-width value and adjusting the other one of the first type parameter and the second type parameter according to the detected signal eye-height value comprises:
   adjusting the one of the first type parameter and the second type parameter according to the first signal eye-width value and the second signal eye-width value.

5. The equalizer tuning method according to claim 4, wherein the first signal eye-height value is a qualified signal eye-height value of the first signal which is detected during the period of modulating the first signal according to the first modulation parameter by the other one of the first modulation circuit and the second modulation circuit,
   wherein the second signal eye-height value is a qualified signal eye-height value of the first signal which is detected during the period of modulating the first signal according to the third modulation parameter by the other one of the first modulation circuit and the second modulation circuit.

6. The equalizer tuning method according to claim 3, wherein the step of detecting the signal eye-width value and the signal eye-height value of the first signal which is sequentially modulated by the first modulation circuit and the second modulation circuit comprises:
- detecting a first signal eye-height value of the first signal having a first signal eye-width value during the period of modulating the first signal according to the first modulation parameter by the other one of the first modulation circuit and the second modulation circuit; and
- detecting a second signal eye-height value of the first signal having a second signal eye-width value during the period of modulating the first signal according to the third modulation parameter by the other one of the first modulation circuit and the second modulation circuit,
- wherein the step of adjusting the one of the first type parameter and the second type parameter according to the detected signal eye-width value and adjusting the other one of the first type parameter and the second type parameter according to the detected signal eye-height value comprises:
- adjusting the other one of the first type parameter and the second type parameter according to the first signal eye-height value and the second signal eye-height value.

7. The equalizer tuning method according to claim 6, wherein the first signal eye-width value is a qualified signal eye-width value of the first signal which is detected during the period of modulating the first signal according to the first modulation parameter by the other one of the first modulation circuit and the second modulation circuit,
- wherein the second signal eye-width value is a qualified signal eye-width value of the first signal which is detected during the period of modulating the first signal according to the third modulation parameter by the other one of the first modulation circuit and the second modulation circuit.

8. The equalizer tuning method according to claim 1, further comprising:
- performing a phase lock operation on the first signal, which is sequentially modulated by the first modulation circuit and the second modulation circuit, by a clock and data recovery circuit.

9. A signal receiving circuit, for a memory storage device, the signal receiving circuit comprising:
- an equalizer circuit; and
- a control circuit, coupled to the equalizer circuit,
- wherein the equalizer circuit comprises a first modulation circuit and a second modulation circuit,
- wherein the equalizer circuit is configured to receive a first signal,
- wherein the equalizer circuit is further configured to modulate, sequentially, the first signal by the first modulation circuit and the output of the first modulation circuit by the second modulation circuit, wherein a modulation performed by the first modulation circuit is performed according to a first type parameter, and a modulation performed by the second modulation circuit is performed according to a second type parameter,
- wherein the control circuit is configured to detect a signal eye-width value and a signal eye-height value of the first signal which is sequentially modulated by the first modulation circuit and the second modulation circuit,
- wherein the control circuit is further configured to adjust one of the first type parameter and the second type parameter according to the detected signal eye-width value and adjusting the other one of the first type parameter and the second type parameter according to the detected signal eye-height value.

10. The signal receiving circuit according to claim 9, wherein the operation of modulating, sequentially, the first signal by the first modulation circuit and the output of the first modulation circuit by the second modulation circuit comprises:
- using a plurality of second modulation parameters sequentially to modulate the first signal by one of the first modulation circuit and the second modulation circuit during a period of modulating the first signal according to a first modulation parameter by the other one of the first modulation circuit and the second modulation circuit.

11. The signal receiving circuit according to claim 10, wherein the operation of modulating, sequentially, the first signal by the first modulation circuit and the output of the first modulation circuit by the second modulation circuit further comprises:
- using a plurality of fourth modulation parameters sequentially to modulate the first signal by the one of the first modulation circuit and the second modulation circuit during a period of modulating the first signal according to a third modulation parameter by the other one of the first modulation circuit and the second modulation circuit,
- wherein the first modulation parameter is different from the third modulation parameter.

12. The signal receiving circuit according to claim 11, wherein the control circuit comprises an eye-width detector, and the eye-width detector is coupled to the first modulation circuit and the second modulation circuit,
- wherein the eye-width detector is configured to detect a first signal eye-width value of the first signal having a first signal eye-height value during the period of modulating the first signal according to the first modulation parameter by the other one of the first modulation circuit and the second modulation circuit,
- wherein the eye-width detector is further configured to detect a second signal eye-width value of the first signal having a second signal eye-height value during the period of modulating the first signal according to the third modulation parameter by the other one of the first modulation circuit and the second modulation circuit,
- wherein the eye-width detector is further configured to adjust the one of the first type parameter and the second type parameter according to the first signal eye-width value and the second signal eye-width value.

13. The signal receiving circuit according to claim 12, wherein the control circuit further comprises an eye-height detector, and the eye-height detector is coupled to the first modulation circuit and the second modulation circuit,
- wherein the first signal eye-height value is a qualified signal eye-height value of the first signal which is detected by the eye-height detector during the period of modulating the first signal according to the first modulation parameter by the other one of the first modulation circuit and the second modulation circuit,
- wherein the second signal eye-height value is a qualified signal eye-height value of the first signal which is detected by the eye-height detector during the period of modulating the first signal according to the third modulation parameter by the other one of the first modulation circuit and the second modulation circuit.

14. The signal receiving circuit according to claim 11, wherein the control circuit comprises an eye-height detector, and the eye-height detector is coupled to the first modulation circuit and the second modulation circuit,
- wherein the eye-height detector is configured to detect a first signal eye-height value of the first signal having a first signal eye-width value during the period of modulating the first signal according to the first modulation parameter by the other one of the first modulation circuit and the second modulation circuit,
- wherein the eye-height detector is further configured to detect a second signal eye-height value of the first signal having a second signal eye-width value during the period of modulating the first signal according to the third modulation parameter by the other one of the first modulation circuit and the second modulation circuit,
- wherein the eye-height detector is further configured to adjust the other one of the first type parameter and the second type parameter according to the first signal eye-height value and the second signal eye-height value.

15. The signal receiving circuit according to claim 14, wherein the control circuit further comprises an eye-width detector, and the eye-width detector is coupled to the first modulation circuit and the second modulation circuit,
- wherein the first signal eye-width value is a qualified signal eye-width value of the first signal which is detected by the eye-width detector during the period of modulating the first signal according to the first modulation parameter by the other one of the first modulation circuit and the second modulation circuit,
- wherein the second signal eye-width value is a qualified signal eye-width value of the first signal which is detected by the eye-width detector during the period of modulating the first signal according to the third modulation parameter by the other one of the first modulation circuit and the second modulation circuit.

16. The signal receiving circuit according to claim 9, further comprises:
- a clock and data recovery circuit, coupled to the equalizer circuit and the control circuit,
- wherein the clock and data recovery circuit is configured to perform a phase lock operation on the first signal which is sequentially modulated by the first modulation circuit and the second modulation circuit.

17. A memory storage device, comprising:
- a connection interface unit, configured to be coupled to a host system;
- a rewritable non-volatile memory module; and
- a memory control circuit unit, coupled to the connection interface unit and the rewritable non-volatile memory module,
- wherein the connection interface unit comprises a signal receiving circuit,
- wherein the signal receiving circuit comprises a first modulation circuit and a second modulation circuit,
- wherein the signal receiving circuit is configured to receive a first signal,
- wherein the signal receiving circuit is configured to modulate, sequentially, the first signal by the first modulation circuit and the output of the first modulation circuit by the second modulation circuit, wherein a modulation performed by the first modulation circuit is performed according to a first type parameter, and a modulation performed by the second modulation circuit is performed according to a second type parameter,
- wherein the signal receiving circuit is configured to detect a signal eye-width value and a signal eye-height value of the first signal which is sequentially modulated by the first modulation circuit and the second modulation circuit,
- wherein the signal receiving circuit is further configured to adjust one of the first type parameter and the second type parameter according to the detected signal eye-width value and adjusting the other one of the first type parameter and the second type parameter according to the detected signal eye-height value.

18. The memory storage device according to claim 17, wherein the operation of modulating, sequentially, the first signal by the first modulation circuit and the output of the first modulation circuit by the second modulation circuit comprises:
- using a plurality of second modulation parameters sequentially to modulate the first signal by one of the first modulation circuit and the second modulation circuit during a period of modulating the first signal according to a first modulation parameter by the other one of the first modulation circuit and the second modulation circuit.

19. The memory storage device according to claim 18, wherein the operation of modulating, sequentially, the first signal by the first modulation circuit and the output of the first modulation circuit by the second modulation circuit further comprises:
- using a plurality of fourth modulation parameters sequentially to modulate the first signal by one of the first modulation circuit and the second modulation circuit during a period of modulating the first signal according to a third modulation parameter by the other one of the first modulation circuit and the second modulation circuit,
- wherein the first modulation parameter is different from the third modulation parameter.

20. The memory storage device according to claim 19, wherein the signal receiving circuit further comprises a control circuit, and the control circuit is coupled to the first modulation circuit and the second modulation circuit,
- wherein the control circuit is configured to detect a first signal eye-width value of the first signal having a first signal eye-height value during the period of modulating the first signal according to the first modulation parameter by the other one of the first modulation circuit and the second modulation circuit,
- wherein the control circuit is further configured to detect a second signal eye-width value of the first signal having a second signal eye-height value during the period of modulating the first signal according to the third modulation parameter by the other one of the first modulation circuit and the second modulation circuit,
- wherein the control circuit is further configured to adjust the one of the first type parameter and the second type parameter according to the first signal eye-width value and the second signal eye-width value.

21. The memory storage device according to claim 20, wherein the first signal eye-height value is a qualified signal eye-height value of the first signal which is detected by the control circuit during the period of modulating the first signal according to the first modulation parameter by the other one of the first modulation circuit and the second modulation circuit,
- wherein the second signal eye-height value is a qualified signal eye-height value of the first signal which is detected by the control circuit during the period of modulating the first signal according to the third modulation parameter by the other one of the first modulation circuit and the second modulation circuit.

22. The memory storage device according to claim 19, wherein the signal receiving circuit further comprises a control circuit, and the control circuit is coupled to the first modulation circuit and the second modulation circuit,
  wherein the control circuit is configured to detect a first signal eye-height value of the first signal having a first signal eye-width value during the period of modulating the first signal according to the first modulation parameter by the other one of the first modulation circuit and the second modulation circuit,
  wherein the control circuit is further configured to detect a second signal eye-height value of the first signal having a second signal eye-width value during the period of modulating the first signal according to the third modulation parameter by the other one of the first modulation circuit and the second modulation circuit,
  wherein the control circuit is further configured to adjust the other one of the first type parameter and the second type parameter according to the first signal eye-height value and the second signal eye-height value.

23. The memory storage device according to claim 22, wherein the first signal eye-width value is a qualified signal eye-width value of the first signal which is detected by the control circuit during the period of modulating the first signal according to the first modulation parameter by the other one of the first modulation circuit and the second modulation circuit,
  wherein the second signal eye-width value is a qualified signal eye-width value of the first signal which is detected by the control circuit during the period of modulating the first signal according to the third modulation parameter by the other one of the first modulation circuit and the second modulation circuit.

24. The memory storage device according to claim 17, wherein the signal receiving circuit is further configured to perform a phase lock operation on the first signal which is sequentially modulated by the first modulation circuit and the second modulation circuit.

* * * * *